(12) United States Patent
Morris et al.

(10) Patent No.: US 9,243,655 B2
(45) Date of Patent: Jan. 26, 2016

(54) ELASTIC ATTACHMENT ASSEMBLY AND METHOD OF REDUCING POSITIONAL VARIATION AND INCREASING STIFFNESS

(71) Applicant: GM GLOBAL TECHNOLOGY OPERATIONS LLC, Detroit, MI (US)

(72) Inventors: Steven E. Morris, Fair Haven, MI (US); Jennifer P. Lawall, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/917,005

(22) Filed: Jun. 13, 2013

(65) Prior Publication Data

US 2014/0369742 A1 Dec. 18, 2014

(51) Int. Cl.
| | |
|---|---|
| F16B 17/00 | (2006.01) |
| F16B 5/07 | (2006.01) |
| F16B 21/08 | (2006.01) |
| F16B 21/09 | (2006.01) |
| F16B 5/06 | (2006.01) |

(52) U.S. Cl.
CPC ............... *F16B 17/002* (2013.01); *F16B 5/07* (2013.01); *F16B 21/088* (2013.01); *F16B 21/09* (2013.01); *F16B 5/0642* (2013.01); *F16B 5/0657* (2013.01); *Y10T 29/4987* (2015.01); *Y10T 403/4949* (2015.01)

(58) Field of Classification Search
USPC .......... 403/326, 242, 252, 280, DIG. 14; 24/297, 604, 605, 664; 296/24.34, 296/37.8, 37.9, 37.11–37.13
See application file for complete search history.

(56) References Cited

U.S. PATENT DOCUMENTS

| | | | |
|---|---|---|---|
| 1,219,398 | A | 3/1917 | Huntsman |
| 1,261,036 | A | 4/1918 | Kerns |
| 1,301,302 | A | 4/1919 | Nolan |
| 1,556,233 | A | 10/1925 | Maise |
| 1,819,126 | A | 8/1931 | Scheibe |
| 1,929,848 | A | 10/1933 | Neely |

(Continued)

FOREIGN PATENT DOCUMENTS

| | | |
|---|---|---|
| CN | 1036250 A | 10/1989 |
| CN | 1129162 A | 8/1996 |

(Continued)

OTHER PUBLICATIONS

U.S. Appl. No. 13/939,503, filed Jul. 11, 2013, entitled "Elastically Averaged Alignment Systems and Methods," inventor: Joel Colombo.

(Continued)

*Primary Examiner* — Daniel Wiley
(74) *Attorney, Agent, or Firm* — Cantor Colburn LLP (57) ABSTRACT

Included is a first component having a base outer surface. Also included is a plurality of elastically deformable protrusions extending from the base outer surface of the first component. Further included is a second component having a pocket portion configured to receive the first component therein, the pocket portion defined by a base wall and at least one sidewall extending from the base wall. Yet further included is a plurality of receiving structures defined by the base wall of the pocket portion and configured to receive the plurality of elastically deformable protrusions, wherein the plurality of elastically deformable protrusions is configured to elastically deform upon insertion to the plurality of receiving structures.

10 Claims, 4 Drawing Sheets

(56) References Cited

U.S. PATENT DOCUMENTS

| | | |
|---|---|---|
| 1,968,168 A | 7/1934 | Place |
| 1,982,076 A | 11/1934 | Spahn |
| 2,006,525 A | 7/1935 | Thal |
| 2,267,558 A | 12/1941 | Birger et al. |
| 2,275,103 A | 3/1942 | Gooch et al. |
| 2,275,900 A | 3/1942 | Hall |
| 2,482,488 A | 9/1949 | Franc |
| 2,612,139 A | 9/1952 | Collins |
| 2,688,894 A | 9/1954 | Modrey |
| 2,707,607 A | 5/1955 | O'Connor |
| 2,778,399 A | 1/1957 | Mroz |
| 2,780,128 A | 2/1957 | Rapata |
| 2,862,040 A | 11/1958 | Curran |
| 2,902,902 A | 9/1959 | Slone |
| 2,946,612 A | 7/1960 | Ahlgren |
| 3,005,282 A | 10/1961 | Christiansen |
| 3,087,352 A | 4/1963 | Daniel |
| 3,089,269 A | 5/1963 | McKiernan |
| 3,130,512 A | 4/1964 | Van Buren, Jr. |
| 3,168,961 A | 2/1965 | Yates |
| 3,169,004 A | 2/1965 | Rapata |
| 3,169,439 A | 2/1965 | Rapata |
| 3,188,731 A | 6/1965 | Sweeney |
| 3,194,292 A | 7/1965 | Borowsky |
| 3,213,189 A | 10/1965 | Mitchell et al. |
| 3,230,592 A | 1/1966 | Hosea |
| 3,233,503 A | 2/1966 | Birger |
| 3,244,057 A | 4/1966 | Mathison |
| 3,248,995 A | 5/1966 | Meyer |
| 3,291,495 A | 12/1966 | Liebig |
| 3,310,929 A | 3/1967 | Garvey |
| 3,413,752 A | 12/1968 | Perry |
| 3,473,283 A | 10/1969 | Meyer |
| 3,531,850 A | 10/1970 | Durand |
| 3,643,968 A | 2/1972 | Horvath |
| 3,680,272 A | 8/1972 | Meyer |
| 3,842,565 A | 10/1974 | Brown et al. |
| 3,845,961 A | 11/1974 | Byrd, III |
| 3,847,492 A | 11/1974 | Kennicutt et al. |
| 3,905,570 A | 9/1975 | Nieuwveld |
| 3,972,550 A | 8/1976 | Boughton |
| 4,035,874 A | 7/1977 | Liljendahl |
| 4,039,215 A | 8/1977 | Minhinnick |
| 4,042,307 A | 8/1977 | Jarvis |
| 4,043,585 A | 8/1977 | Yamanaka |
| 4,169,297 A | 10/1979 | Weihrauch |
| 4,213,675 A | 7/1980 | Pilhall |
| 4,237,573 A | 12/1980 | Weihrauch |
| 4,300,851 A | 11/1981 | Thelander |
| 4,313,609 A | 2/1982 | Clements |
| 4,318,208 A | 3/1982 | Borja |
| 4,325,574 A | 4/1982 | Umemoto et al. |
| 4,363,839 A | 12/1982 | Watanabe et al. |
| 4,364,150 A | 12/1982 | Remington |
| 4,384,803 A | 5/1983 | Cachia |
| 4,394,853 A | 7/1983 | Lopez-Crevillen et al. |
| 4,406,033 A | 9/1983 | Chisholm et al. |
| 4,477,142 A | 10/1984 | Cooper |
| 4,481,160 A | 11/1984 | Bree |
| 4,575,060 A | 3/1986 | Kitagawa |
| 4,605,575 A | 8/1986 | Auld et al. |
| 4,616,951 A | 10/1986 | Maatela |
| 4,648,649 A | 3/1987 | Beal |
| 4,654,760 A | 3/1987 | Matheson et al. |
| 4,745,656 A | 5/1988 | Revlett |
| 4,767,647 A | 8/1988 | Bree |
| 4,807,335 A | 2/1989 | Candea |
| 4,817,999 A | 4/1989 | Drew |
| 4,819,983 A | 4/1989 | Alexander et al. |
| 4,881,764 A | 11/1989 | Takahashi et al. |
| 4,973,212 A | 11/1990 | Jacobs |
| 4,977,648 A | 12/1990 | Eckerud |
| 5,139,285 A | 8/1992 | Lasinski |
| 5,154,479 A | 10/1992 | Sautter, Jr. |
| 5,170,985 A | 12/1992 | Killworth et al. |
| 5,180,219 A | 1/1993 | Geddie |
| 5,208,507 A | 5/1993 | Jung |
| 5,212,853 A | 5/1993 | Kaneko |
| 5,297,322 A | 3/1994 | Kraus |
| 5,342,139 A | 8/1994 | Hoffman |
| 5,368,797 A | 11/1994 | Quentin et al. |
| 5,446,965 A | 9/1995 | Makridis |
| 5,507,610 A * | 4/1996 | Benedetti et al. ............. 411/339 |
| 5,513,603 A | 5/1996 | Ang et al. |
| 5,556,808 A | 9/1996 | Williams et al. |
| 5,575,601 A | 11/1996 | Skufca |
| 5,577,301 A * | 11/1996 | De Maagd ..................... 24/295 |
| 5,577,779 A * | 11/1996 | Dangel ............................ 292/80 |
| 5,580,204 A * | 12/1996 | Hultman ........................ 411/509 |
| 5,586,372 A | 12/1996 | Eguchi et al. |
| 5,601,453 A | 2/1997 | Horchler |
| 5,634,757 A | 6/1997 | Schanz |
| 5,657,516 A | 8/1997 | Berg et al. |
| 5,667,271 A | 9/1997 | Booth |
| 5,670,013 A | 9/1997 | Huang et al. |
| 5,698,276 A | 12/1997 | Mirabitur |
| 5,736,221 A | 4/1998 | Hardigg et al. |
| 5,765,942 A | 6/1998 | Shirai et al. |
| 5,795,118 A | 8/1998 | Osada et al. |
| 5,797,170 A | 8/1998 | Akeno |
| 5,803,646 A | 9/1998 | Weihrauch |
| 5,806,915 A | 9/1998 | Takabatake |
| 5,810,535 A | 9/1998 | Fleckenstein et al. |
| 5,820,292 A | 10/1998 | Fremstad |
| 5,846,631 A | 12/1998 | Nowosiadly |
| 5,941,673 A | 8/1999 | Hayakawa et al. |
| 6,073,315 A | 6/2000 | Rasmussen |
| 6,095,594 A | 8/2000 | Riddle et al. |
| 6,164,603 A | 12/2000 | Kawai |
| 6,193,430 B1 | 2/2001 | Culpepper et al. |
| 6,202,962 B1 | 3/2001 | Snyder |
| 6,209,175 B1 | 4/2001 | Gershenson |
| 6,209,178 B1 | 4/2001 | Wiese et al. |
| 6,264,869 B1 | 7/2001 | Notarpietro et al. |
| 6,299,478 B1 | 10/2001 | Jones et al. |
| 6,321,495 B1 | 11/2001 | Oami |
| 6,349,904 B1 | 2/2002 | Polad |
| 6,354,815 B1 | 3/2002 | Svihla et al. |
| 6,378,931 B1 * | 4/2002 | Kolluri et al. ............ 296/146.15 |
| 6,398,449 B1 | 6/2002 | Loh |
| 6,484,370 B2 * | 11/2002 | Kanie et al. ..................... 24/297 |
| 6,523,817 B1 | 2/2003 | Landry, Jr. |
| 6,533,391 B1 | 3/2003 | Pan |
| 6,543,979 B2 | 4/2003 | Iwatsuki |
| 6,557,260 B1 | 5/2003 | Morris |
| 6,568,701 B1 | 5/2003 | Burdack et al. |
| 6,579,397 B1 | 6/2003 | Spain et al. |
| 6,591,801 B1 | 7/2003 | Fonville |
| 6,609,717 B2 | 8/2003 | Hinson |
| 6,658,698 B2 | 12/2003 | Chen |
| 6,662,411 B2 | 12/2003 | Rubenstein |
| 6,664,470 B2 | 12/2003 | Nagamoto |
| 6,677,065 B2 | 1/2004 | Blauer |
| 6,692,016 B2 | 2/2004 | Yokota |
| 6,712,329 B2 | 3/2004 | Ishigami et al. |
| 6,746,172 B2 | 6/2004 | Culpepper |
| 6,799,758 B2 | 10/2004 | Fries |
| 6,840,969 B2 | 1/2005 | Kobayashi et al. |
| 6,857,676 B2 * | 2/2005 | Kawaguchi et al. ......... 296/37.9 |
| 6,857,809 B2 | 2/2005 | Granata |
| 6,908,117 B1 | 6/2005 | Pickett, Jr. et al. |
| 6,932,416 B2 * | 8/2005 | Clauson ..................... 296/146.7 |
| 6,948,753 B2 | 9/2005 | Yoshida et al. |
| 6,951,349 B2 | 10/2005 | Yokota |
| 6,959,954 B2 * | 11/2005 | Brandt et al. ................ 296/1.08 |
| 6,966,601 B2 | 11/2005 | Matsumoto et al. |
| 6,971,831 B2 | 12/2005 | Fattori et al. |
| 6,997,487 B2 | 2/2006 | Kitzis |
| 7,000,941 B2 | 2/2006 | Yokota |
| 7,008,003 B1 * | 3/2006 | Hirose et al. ............... 296/146.7 |
| 7,014,094 B2 | 3/2006 | Alcoe |
| 7,017,239 B2 | 3/2006 | Kurily et al. |
| 7,036,779 B2 | 5/2006 | Kawaguchi et al. |
| 7,073,260 B2 | 7/2006 | Jensen |

(56) References Cited

U.S. PATENT DOCUMENTS

| | | |
|---|---|---|
| 7,089,998 B2 | 8/2006 | Crook |
| 7,121,611 B2 | 10/2006 | Hirotani et al. |
| 7,144,183 B2 | 12/2006 | Lian et al. |
| 7,178,855 B2 * | 2/2007 | Catron et al. ............. 296/146.7 |
| 7,198,315 B2 | 4/2007 | Cass et al. |
| 7,234,852 B2 | 6/2007 | Nishizawa et al. |
| 7,306,418 B2 | 12/2007 | Kornblum |
| 7,322,500 B2 * | 1/2008 | Maierholzner ............... 224/486 |
| 7,344,056 B2 * | 3/2008 | Shelmon et al. ............. 224/549 |
| 7,435,031 B2 | 10/2008 | Granata |
| 7,454,105 B2 | 11/2008 | Yi |
| 7,487,884 B2 | 2/2009 | Kim |
| 7,557,051 B2 | 7/2009 | Ryu et al. |
| 7,568,316 B2 | 8/2009 | Choby et al. |
| D602,349 S | 10/2009 | Andersson |
| 7,764,853 B2 | 7/2010 | Yi |
| 7,793,998 B2 | 9/2010 | Matsui et al. |
| 7,802,831 B2 * | 9/2010 | Isayama et al. ............ 296/24.34 |
| 7,828,372 B2 * | 11/2010 | Ellison ......................... 296/191 |
| 7,862,272 B2 | 1/2011 | Nakajima |
| 7,869,003 B2 | 1/2011 | Van Doren et al. |
| 7,922,415 B2 | 4/2011 | Rudduck et al. |
| 7,946,684 B2 | 5/2011 | Drury et al. |
| 8,029,222 B2 | 10/2011 | Nitsche |
| 8,061,861 B2 | 11/2011 | Paxton et al. |
| 8,101,264 B2 | 1/2012 | Pace et al. |
| 8,203,496 B2 | 6/2012 | Miller et al. |
| 8,203,843 B2 | 6/2012 | Chen |
| 8,276,961 B2 | 10/2012 | Kwolek |
| 8,297,137 B2 * | 10/2012 | Dole .............................. 74/1 R |
| 8,297,661 B2 | 10/2012 | Proulx et al. |
| 8,414,048 B1 | 4/2013 | Kwolek |
| 8,444,199 B2 * | 5/2013 | Takeuchi et al. ............. 296/37.8 |
| 8,677,573 B2 | 3/2014 | Lee |
| 8,720,016 B2 | 5/2014 | Beaulieu |
| 8,726,473 B2 | 5/2014 | Dole |
| 8,826,499 B2 | 9/2014 | Tempesta |
| 8,833,832 B2 | 9/2014 | Whipps |
| 8,834,058 B2 | 9/2014 | Woicke |
| 9,039,318 B2 | 5/2015 | Mantei et al. |
| 9,050,690 B2 | 6/2015 | Hammer et al. |
| 9,061,715 B2 | 6/2015 | Morris |
| 9,067,625 B2 | 6/2015 | Morris |
| 2001/0030414 A1 | 10/2001 | Yokota |
| 2001/0045757 A1 | 11/2001 | Kanie et al. |
| 2002/0045086 A1 | 4/2002 | Tsuji et al. |
| 2002/0060275 A1 | 5/2002 | Polad |
| 2002/0136617 A1 | 9/2002 | Imahigashi |
| 2003/0007831 A1 | 1/2003 | Lian et al. |
| 2003/0080131 A1 | 5/2003 | Fukuo |
| 2003/0082986 A1 | 5/2003 | Wiens et al. |
| 2003/0087047 A1 | 5/2003 | Blauer |
| 2003/0108401 A1 | 6/2003 | Agha et al. |
| 2003/0180122 A1 | 9/2003 | Dobson |
| 2004/0028503 A1 | 2/2004 | Charles |
| 2004/0037637 A1 | 2/2004 | Lian et al. |
| 2004/0131896 A1 | 7/2004 | Blauer |
| 2004/0139678 A1 | 7/2004 | Pervan |
| 2004/0140651 A1 | 7/2004 | Yokota |
| 2004/0208728 A1 | 10/2004 | Fattori et al. |
| 2005/0016116 A1 | 1/2005 | Scherff |
| 2005/0031946 A1 | 2/2005 | Kruger et al. |
| 2005/0054229 A1 | 3/2005 | Tsuya |
| 2005/0082449 A1 | 4/2005 | Kawaguchi et al. |
| 2005/0156409 A1 | 7/2005 | Yokota |
| 2005/0156410 A1 | 7/2005 | Yokota |
| 2005/0156416 A1 | 7/2005 | Yokota |
| 2005/0244250 A1 | 11/2005 | Okada et al. |
| 2006/0102214 A1 | 5/2006 | Clemons |
| 2006/0110109 A1 | 5/2006 | Yu |
| 2006/0141318 A1 | 6/2006 | MacKinnon et al. |
| 2006/0197356 A1 * | 9/2006 | Catron et al. ............. 296/146.7 |
| 2006/0249520 A1 | 11/2006 | DeMonte |
| 2006/0264076 A1 | 11/2006 | Chen |
| 2007/0040411 A1 | 2/2007 | Dauvergne |
| 2007/0126211 A1 | 6/2007 | Moerke et al. |
| 2007/0144659 A1 | 6/2007 | De La Fuente |
| 2007/0274777 A1 | 11/2007 | Winkler |
| 2007/0292205 A1 | 12/2007 | Duval |
| 2008/0014508 A1 | 1/2008 | Van Doren et al. |
| 2008/0018128 A1 | 1/2008 | Yamagiwa et al. |
| 2008/0073888 A1 | 3/2008 | Enriquez |
| 2008/0094447 A1 | 4/2008 | Drury et al. |
| 2008/0128346 A1 | 6/2008 | Bowers |
| 2008/0217796 A1 | 9/2008 | Van Bruggen et al. |
| 2008/0260488 A1 | 10/2008 | Scroggie et al. |
| 2009/0028506 A1 | 1/2009 | Yi et al. |
| 2009/0072591 A1 | 3/2009 | Baumgartner |
| 2009/0091156 A1 | 4/2009 | Neubrand |
| 2009/0134652 A1 * | 5/2009 | Araki ........................... 296/37.8 |
| 2009/0174207 A1 * | 7/2009 | Lota ........................... 296/24.34 |
| 2009/0243172 A1 | 10/2009 | Ting et al. |
| 2009/0265896 A1 | 10/2009 | Beak |
| 2010/0001539 A1 | 1/2010 | Kikuchi et al. |
| 2010/0021267 A1 | 1/2010 | Nitsche |
| 2010/0061045 A1 | 3/2010 | Chen |
| 2010/0102538 A1 | 4/2010 | Paxton et al. |
| 2010/0134128 A1 | 6/2010 | Hobbs |
| 2010/0147355 A1 | 6/2010 | Shimizu et al. |
| 2010/0247034 A1 | 9/2010 | Yi et al. |
| 2011/0012378 A1 | 1/2011 | Ueno et al. |
| 2011/0031291 A1 * | 2/2011 | Oakes .......................... 224/401 |
| 2011/0076588 A1 | 3/2011 | Yamaura |
| 2011/0119875 A1 | 5/2011 | Iwasaki |
| 2011/0175376 A1 | 7/2011 | Whitens et al. |
| 2011/0207024 A1 | 8/2011 | Bogumil et al. |
| 2011/0239418 A1 | 10/2011 | Huang |
| 2011/0296764 A1 | 12/2011 | Sawatani et al. |
| 2011/0311332 A1 | 12/2011 | Ishman |
| 2012/0020726 A1 | 1/2012 | Jan |
| 2012/0073094 A1 | 3/2012 | Bishop |
| 2012/0115010 A1 | 5/2012 | Smith et al. |
| 2012/0240363 A1 | 9/2012 | Lee |
| 2012/0251226 A1 | 10/2012 | Liu et al. |
| 2012/0261951 A1 | 10/2012 | Mildner et al. |
| 2012/0321379 A1 | 12/2012 | Wang et al. |
| 2013/0019454 A1 | 1/2013 | Colombo et al. |
| 2013/0019455 A1 | 1/2013 | Morris |
| 2013/0027852 A1 | 1/2013 | Wang |
| 2013/0071181 A1 | 3/2013 | Herzinger et al. |
| 2013/0157015 A1 | 6/2013 | Morris |
| 2013/0212858 A1 | 8/2013 | Herzinger et al. |
| 2013/0269873 A1 | 10/2013 | Herzinger et al. |
| 2013/0287992 A1 | 10/2013 | Morris |
| 2014/0033493 A1 | 2/2014 | Morris et al. |
| 2014/0041176 A1 | 2/2014 | Morris |
| 2014/0041185 A1 | 2/2014 | Morris et al. |
| 2014/0041199 A1 | 2/2014 | Morris |
| 2014/0042704 A1 | 2/2014 | Polewarczyk |
| 2014/0047691 A1 | 2/2014 | Colombo et al. |
| 2014/0047697 A1 | 2/2014 | Morris |
| 2014/0080036 A1 | 3/2014 | Smith et al. |
| 2014/0132023 A1 | 5/2014 | Watanabe |
| 2014/0175774 A1 | 6/2014 | Kansteiner |
| 2014/0202628 A1 | 7/2014 | Sreetharan et al. |
| 2014/0208561 A1 | 7/2014 | Colombo et al. |
| 2014/0208572 A1 | 7/2014 | Colombo et al. |
| 2014/0360824 A1 | 12/2014 | Morris et al. |
| 2014/0360826 A1 | 12/2014 | Morris et al. |
| 2014/0366326 A1 | 12/2014 | Colombo et al. |
| 2015/0069779 A1 | 3/2015 | Morris et al. |
| 2015/0078805 A1 | 3/2015 | Morris et al. |

FOREIGN PATENT DOCUMENTS

| | | |
|---|---|---|
| CN | 1205285 A | 1/1999 |
| CN | 1328521 A | 12/2001 |
| CN | 1426872 A | 7/2003 |
| CN | 2661972 Y | 12/2004 |
| CN | 1670986 A | 9/2005 |
| CN | 100573975 C | 9/2005 |
| CN | 1693721 A | 11/2005 |
| CN | 1771399 A | 5/2006 |
| CN | 1774580 A | 5/2006 |

(56) References Cited

FOREIGN PATENT DOCUMENTS

| | | |
|---|---|---|
| CN | 1933747 A | 3/2007 |
| CN | 2888807 Y | 4/2007 |
| CN | 2915389 Y | 6/2007 |
| CN | 101250964 A | 4/2008 |
| CN | 201259846 Y | 6/2009 |
| CN | 201268336 Y | 7/2009 |
| CN | 201310827 Y | 9/2009 |
| CN | 201540513 U | 8/2010 |
| CN | 101821534 | 9/2010 |
| CN | 201703439 U | 1/2011 |
| CN | 201737062 U | 2/2011 |
| CN | 201792722 U | 4/2011 |
| CN | 201890285 U | 7/2011 |
| CN | 102144102 A | 8/2011 |
| CN | 202079532 U | 12/2011 |
| CN | 102313952 A | 1/2012 |
| CN | 202132326U U | 2/2012 |
| CN | 102803753 A | 11/2012 |
| CN | 202686206 U | 1/2013 |
| DE | 1220673 B | 7/1966 |
| DE | 2736012 A1 | 2/1978 |
| DE | 3704190 A1 | 12/1987 |
| DE | 3711696 A1 | 10/1988 |
| DE | 3805693 A1 | 2/1989 |
| DE | 3815927 | 11/1989 |
| DE | 9109276 U1 | 7/1991 |
| DE | 4002443 A1 | 8/1991 |
| DE | 4111245 A1 | 10/1991 |
| DE | 9201258 U1 | 3/1992 |
| DE | 29714892 U1 | 10/1997 |
| DE | 29800379 U1 | 5/1998 |
| DE | 69600357 T2 | 12/1998 |
| DE | 10234253 B3 | 4/2004 |
| DE | 102008005618 A1 | 7/2009 |
| DE | 102010028323 A1 | 11/2011 |
| DE | 102011050003 A1 | 10/2012 |
| DE | 102012212101 B3 | 7/2013 |
| EP | 0118796 | 9/1984 |
| EP | 1132263 A1 | 9/2001 |
| EP | 1273766 A1 | 1/2003 |
| EP | 1293384 A2 | 3/2003 |
| EP | 1384536 A2 | 1/2004 |
| EP | 1388449 A1 | 2/2004 |
| EP | 2166235 A2 | 3/2010 |
| EP | 2450259 A1 | 5/2012 |
| EP | 2458454 A1 | 5/2012 |
| FR | 1369198 A | 8/1964 |
| FR | 2009941 A1 | 2/1970 |
| FR | 2750177 A2 | 12/1997 |
| FR | 2958696 A1 | 10/2011 |
| GB | 2281950 A | 3/1995 |
| JP | 2001171554 A | 6/2001 |
| JP | 2005268004 | 9/2005 |
| JP | 2006205918 | 8/2006 |
| JP | 2008307938 A | 12/2008 |
| JP | 2009084844 | 4/2009 |
| JP | 2009187789 A | 8/2009 |
| WO | 2001032454 A3 | 11/2001 |
| WO | 2008140659 A1 | 11/2008 |
| WO | 2013191622 A1 | 12/2013 |

OTHER PUBLICATIONS

U.S. Appl. No. 13/940,912, filed Jul. 12, 2013, entitled "Alignment Arrangement for Mated Components and Method", inventors: Steven E. Morris and Jennifer P. Lawall.

U.S. Appl. No. 13/945,231, filed Jul. 18, 2013, entitled "Lobular Elastic Tube Alignment System for Providing Precise Four-Way Alignment of Components", Inventors: Steven E. Morris and Jennifer P. Lawall.

U.S. Appl. No. 13/954,198, filed Jul. 30, 2013, entitled "Elastic Alignment and Retention System and Method," inventors: Steven E Morris, Edward D. Groninger, and Raymond J. Chess.

U.S. Appl. No. 13/966,523, filed Aug. 14, 2013, entitled "Elastically Averaged Alignment Systems and Methods Thereof," inventors: Steven E. Morris, Jennifer P. Lawall and Joel Colombo.

U.S. Appl. No. 13/973,587, filed Aug. 22, 2013, entitled "Elastic Averaging Alignment System and Method," inventors: Steven E. Morris and Jennifer P. Lawall.

U.S. Appl. No. 13/974,729, filed Aug. 23, 2013, entitled "Elastic Averaging Snap ember Aligning and Fastening System", inventors: Steven E. Morris and Jennifer P. Lawall.

U.S. Appl. No. 14/012,205, filed Aug. 28, 2013, entitled "Elastically Deformable Alignment Fastener and System," inventors: Steven E. Morris, Marc J. Tahnoose, Michael E. McGuire and Jennifer P. Lawall.

U.S. Appl. No. 14/021,282, filed Sep. 9, 2013, entitled "Elastic Tube Alignment and Fastening System for Providing Precise Alignment and Fastening of Components," inventors: Steven E. Morris and Jennifer P. Lawall.

U.S. Appl. No. 14/031,647, filed Sep. 19, 2013, entitled "Elastically Averaged Alignment Systems and Methods," inventors: Steven E. Morris, Joel Colombo, Jennifer P. Lawall, Jeffrey L. Konchan, and Steve J. Briggs.

U.S. Appl. No. 14/038,241, filed Sep. 26, 2013, entitled "Serviceable Aligning and Self-Retaining Elastic Arrangement for Mated Components and Method," inventors: Steven E. Morris, Jennifer P. Lawall and Joel Colombo.

U.S. Appl. No. 14/039,614, filed Sep. 27, 2013, entitled "Elastically Averaged Alignment Systems and Methods," inventor: Steven E. Morris.

U.S. Appl. No. 14/044,199, filed Oct. 2, 2013, entitled "Lobular Elastic Tube Alignment and Retention System for Providing Precise Alignment of Components," inventors: Steven E. Morris and Jennifer P. Lawall.

U.S. Appl. No. 14/044,207, filed Oct. 2, 2013, entitled "Elastic Aperture Alignment System for Providing Precise Four-Way Alignment of Components," inventors: Steven E. Morris and Jennifer P. Lawall.

U.S. Appl. No. 14/045,463, filed Oct. 3, 2013, entitled "Elastically Averaged Alignment Systems and Methods," inventors: Steven E. Morris and Jennifer P. Lawall.

U.S. Appl. No. 14/081,361, filed Nov. 15, 2013, entitled "Elastically Deformable Clip and Method," inventors: Steven E. Morris, Jennifer P. Lawall and Jeffrey M. Gace.

U.S. Appl. No. 14/104,321, filed Dec. 12, 2013, entitled "Alignment and Retention System for a Flexible Assembly," inventors: Steven E. Morris and Jennifer P. Lawall.

U.S. Appl. No. 14/104,327, filed Dec. 12, 2013, entitled "Self-Retaining Alignment System for Providing Precise Alignment and Retention of Components," inventors: Steven E. Morris, Jennifer P. Lawall and Toure D. Lee.

U.S. Appl. No. 14/104,333, filed Dec. 12, 2013, entitled "Alignment System for Providing Precise Alignment and Retention of Components of a Sealable Compartment, " inventors: Steven E. Morris, Christopher J. Georgi, Jennifer P. Lawall and Gordan N. Noll.

U.S. Appl. No. 14/104,541, filed Dec. 12, 2013, entitled "Alignment and Retention System for Providing Precise Alignment and Retention of Components," inventors: Steven E. Morris and Jennifer P. Lawall.

U.S. Appl. No. 14/104,549, filed Dec. 12, 2013, entitled "Alignment System for Providing Alignment of Components Having Contoured Features," inventors: Steven E. Morris and Jennifer P. Lawall.

U.S. Appl. No. 14/108,921, filed Dec. 17, 2013, entitled "Elastically Averaged Alignment Systems and Methods Thereof," inventors: Steven E. Morris and Jennifer P. Lawall.

U.S. Appl. No. 14/108,931, filed Dec. 17, 2013, entitled "Elastically Averaged Strap Systems and Methods," inventors: Steven E. Morris and Jennifer P. Lawall.

U.S. Appl. No. 14/109,296, filed Dec. 17, 2013, entitled "Fastener for Operatively Coupling Matable Components, " inventors: Steven E. Morris and Jennifer P. Lawall.

U.S. Appl. No. 14/134,622, filed Dec. 19, 2013, entitled "Elastic Averaging Alignment Member," inventors: Steven E. Morris and Jennifer P. Lawall.

U.S. Appl. No. 14/134,801, filed Dec. 19, 2013, entitled "Elastically Averaged Alignment Systems and Methods," inventors: Steven E. Morris and Jennifer P. Lawall.

(56) References Cited

OTHER PUBLICATIONS

U.S. Appl. No. 14/134,844, filed Dec. 19, 2013, entitled "Elastically Deformable Module Installation Assembly," inventors: Steven E. Morris and Jennifer P. Lawall.
U.S. Appl. No. 14/134,888, filed Dec. 19, 2013, entitled "Elastic Retaining Assembly and Method," inventors: Steven E. Morris and Jennifer P. Lawall.
U.S. Appl. No. 14/136,502, filed Dec. 20, 2013, entitled "Elastically Averaged Alignment Systems and Methods," inventors: Timothy A. Kiester, Steven E. Morris, Kenton L. West, Scott J. Fast, and Evan Phillips.
U.S. Appl. No. 14/151,279, filed Jan. 9, 2014, entitled "Elastically Averaged Alignment Systems and Methods," inventors: Steven E. Morris and Jennifer P. Lawall.
U.S. Appl. No. 14/153,741, filed Jan. 13, 2014, entitled "Elastically Averaged Assembly for Closure Applications," inventors: Steven E. Morris, Jeffrey A. Abell, Jennifer P. Lawall, and Jeffrey L. Konchan.
U.S. Appl. No. 14/180,882, filed Feb. 14, 2014, entitled "Elastic Tube Alignment System for Precisely Locating Components," inventor: Steven E. Morris.
U.S. Appl. No. 14/181,142, filed Feb. 14, 2014, entitled "Elastic Tube Alignment System for Precisely Locating Components," inventor: Steven E. Morris.
U.S. Appl. No. 14/185,422, filed Feb. 20, 2014, entitled "Elastically Averaged Alignment Systems and Methods," inventors: Joel Colombo, Steven E. Morris, Jennifer P. Lawall and Ashish M. Gollapalli.
U.S. Appl. No. 14/185,472, filed Feb. 20, 2014, entitled "Elastically Averaged Alignment Systems and Method," inventors: Steven E. Morris, Jennifer P. Lawall and Kee Hyuk Im.
U.S. Appl. No. 14/231,395, filed Mar. 31, 2014, entitled "Elastically Averaged Alignment Systems and Methods," inventors: Joel Colombo, Steven E. Morris, Jennifer P. Lawall, and Ashish M. Gollapalli.
U.S. Appl. No. 14/249,746, filed Apr. 10, 2014, entitled "Elastically Averaged Alignment Systems and Methods," inventors: Joel Colombo and Catherine A. Ostrander.
U.S. Appl. No. 14/259,747, filed Apr. 23, 2014, entitled "System for Elastically Averaging Assembly of Components," inventors: Steven E. Morris and Jennifer P. Lawall.
Cross-sectional view of a prior art infrared welded assembly of BMW, Munich, Germany. Believed on the market since about Jan. 1, 2010.
"Elastic Averaging in Flexture Mechanisms: A Multi-Beam Paralleaogram Flexture Case-Study" by Shorya Awtar and EDIP Sevincer, Proceedings of IDETC/CIE 2006, Paper DETC2006-99752, American Society of Mechanical Engineers (ASME), Sep. 2006.
"An Anti Backlash Two-Part Shaft Coupling With Interlocking Elastically Averaged Teeth" by Mahadevan Balasubramaniam, Edmund Golaski, Seung-Kil Son, Krishnan Sriram, and Alexander Slocum, Precision Engineering, V. 26, No. 3, Elsevier Publishing, Jul. 2002.
"The Design of High Precision Parallel Mechnisms Using Binary Actuation and Elastic Averaging: With Application to MRI Cancer Treatment" by L.M. Devita, J.S. Plante, and S. Dubowsky, 12th IFToMM World Congress (France), Jun. 2007.
"Passive Alignment of Micro-Fluidic Chips Using the Principle of Elastic Averaging" by Sitanshu Gurung, Thesis, Louisiana State University, Dept. of Mechanical Engineering, Dec. 2007.
"Precision Connector Assembly Using Elastic Averaging" by Patrick J. Willoughby and Alexander H. Slocum, Massachusetts Institute of Technology (MIT), Cambridge, MA, American Society for Precision Engineering, 2004.
U.S. Appl. No. 13/229,926, filed Sep. 12, 2011, entitled "Using Elastic Averaging for Alignment of Battery Stack, Fuel Cell Stack, or Other Vehicle Assembly", inventors: Mark A. Smith, Ronald Daul, Xiang Zhao, David Okonski, Elmer Santos, Lane Lindstrom, and Jeffrey A. Abell.
U.S. Appl. No. 13/330,718, filed Dec. 20, 2011, entitled "Precisely Locating Components in an Infrared Welded Assembly", inventor: Steven E. Morris.
U.S. Appl. No. 13/459,118, filed Apr. 28, 2012, entitled "Stiffened Multi-Layer Compartment Door Assembly Utilizing Elastic Averaging," inventor: Steven E. Morris.
U.S. Appl. No. 13/567,580, filed Aug. 6, 2012, entitled "Semi-Circular Alignment Features of an Elastic Averaging Alignment System", inventors: Steven E. Morris and Thomas F. Bowles.
U.S. Appl. No. 13/570,959, filed Aug. 9, 2012, entitled "Elastic Cantilever Beam Alignment System for Precisely Aligning Components", inventor: Steven E. Morris.
U.S. Appl. No. 13/571,030, filed Aug. 9, 2012, entitled "Elastic Tube Alignment System for Precisely Locating an Emblem Lens to an Outer Bezel", inventors: Joel Colombo, Steven E. Morris, and Michael D. Richardson.
U.S. Appl. No. 13/752,449, filed Jan. 29, 2013, entitled "Elastic Insert Alignment Assembly and Method of Reducing Positional Variation", inventors: Steven E. Morris and Michael D. Richardson.
U.S. Appl. No. 13/755,759, filed Jan. 31, 2013, entitled "Elastic Alignment Assembly for Aligning Mated Components and Method of Reducing Positional Variation", inventors: Joel Colombo, Michael D. Richardson, and Steven E. Morris.
U.S. Appl. No. 13/851,222, filed Mar. 27, 2013, entitled "Elastically Averaged Alignment System", inventors: Joel Colombo and Steven E. Morris.
U.S. Appl. No. 13/855,928, filed Apr. 3, 2013, entitled "Elastic Averaging Alignment System, Method of Making the Same and Cutting Punch Therefor", inventors: Steven E. Morris, Jennifer P. Lawall, Joel Colombo, and Jeffrey L. Konchan.
U.S. Appl. No. 13/856,888, filed Apr. 4, 2013, entitled "Elastic Retaining Assembly for Matable Components and Method of Assembling", inventors: Steven E. Morris, Jennifer P. Lawall, Joel Colombo, and Toure D. Lee.
U.S. Appl. No. 13/856,927, filed Apr. 4, 2013, entitled "Elastic Tubular Attachment Assembly for Mating Components and Method of Mating Components ", inventors: Steven E. Morris and Jennifer P. Lawall.
U.S. Appl. No. 13/856,956, filed Apr. 4, 2013, entitled "Elastic Clip Retaining Arrangement and Method of Mating Structures with an Elastic Clip Retaining Arrangement", inventors: Joel Colombo, Steven E. Morris and Jeffrey L. Konchan.
U.S. Appl. No. 13/856,973, filed Apr. 4, 2014, entitled "Elastically Deformable Flange Locator Arrangement and Method of Reducing Positional Variation", inventors: Joel Colombo, Steven E. Morris and Michael D. Richardson.
U.S. Appl. No. 13/858,478, filed Apr. 8, 2013, entitled "Elastic Mating Assembly and Method of Elastically Assembling Matable Components", inventors: Steven E. Morris and Jennifer P. Lawall.
U.S. Appl. No. 13/859,109, filed Apr. 9, 2013, entitled "Elastic Retaining Arrangement for Jointed Components and Method of Reducing a Gap Between Jointed Components," inventors: Steven E. Morris, James M. Kushner, Victoria L. Enyedy, Jennifer P. Lawall, and Piotr J. Ogonek.
U.S. Appl. No. 13/915,132, filed Jun. 11, 2013, entitled "Elastically Deformable Energy Management Arrangement and Method of Managing Energy Absorption," inventors: Steven E. Morris, Randy A. Johnson and Jennifer P. Lawall.
U.S. Appl. No. 13/915,177, filed Jun. 11, 2013, entitled "Elastically Deformable Energy Management Assembly and Method of Managing Energy Absorption," inventors: Steven E. Morris, Jennifer P. Lawall, and Randy Johnson.
U.S. Appl. No. 13/917,005, filed Jun. 13, 2013, entitled "Elastic Attachment Assembly and Method of Reducing Positional Variation and Increasing Stiffness," inventors: Steven E. Morris and Jennifer P. Lawall.
U.S. Appl. No. 13/917,074, filed Jun. 13, 2013, entitled "Elastically Deformable Retaining Hook for Components to be Mated Together and Method of Assembling", inventors: Joel Colombo, Jeffrey L. Konchan, Steven E. Morris, and Steve J. Briggs.
U.S. Appl. No. 13/918,183, filed Jun. 14, 2013, entitled "Elastic Retaining Assembly for Matable Components and Method of Assembling," inventors: Steven E. Morris and Jennifer P. Lawall.

\* cited by examiner

ELASTIC ATTACHMENT ASSEMBLY AND METHOD OF REDUCING POSITIONAL VARIATION AND INCREASING STIFFNESS

FIELD OF THE INVENTION

The present invention relates to a matable component assembly and, more particularly, to an elastic attachment assembly for mating, aligning, and stiffening connection between mated components, as well as a method of reducing positional variation and increasing stiffness.

BACKGROUND

Currently, components which are to be mated together in a manufacturing process are subject to positional variation based on the mating arrangements between the components. One common arrangement includes components mutually located with respect to each other by 2-way and/or 4-way male alignment features; typically undersized structures which are received into corresponding oversized female alignment features such as apertures in the form of holes and/or slots. Alternatively, adhesives or welding processes may be employed to mate parts. Irrespective of the precise mating method, there is a clearance between at least a portion of the alignment features which is predetermined to match anticipated size and positional variation tolerances of the mating features as a result of manufacturing (or fabrication) variances. As a result, occurrence of significant positional variation between the mated components may contribute to the presence of free movement causing undesirable motion between the mating components, which contributes to increased vibration. Additional undesirable effects may include squeaking and rattling of the mated components, for example.

SUMMARY OF THE INVENTION

In one exemplary embodiment, an elastic attachment assembly for mating and aligning components is provided. The elastic attachment assembly includes a first component having a base outer surface. Also included is a plurality of elastically deformable protrusions extending from the base outer surface of the first component. Further included is a second component having a pocket portion configured to receive the first component therein, the pocket portion is defined by a base wall and at least one sidewall extending from the base wall. Yet further included is a plurality of receiving structures defined by the base wall of the pocket portion and configured to receive the plurality of elastically deformable protrusions, wherein the plurality of elastically deformable protrusions is configured to elastically deform upon insertion to the plurality of receiving structures.

In another exemplary embodiment, a method of increasing stiffness of an elastic attachment assembly is provided. The method includes inserting a first component into a pocket portion of a second component. The method also includes engaging a plurality of elastically deformable protrusions extending from a base outer surface of the first component with a plurality of receiving structures defined by a base wall of the pocket portion. The method further includes elastically deforming the plurality of elastically deformable protrusions upon engagement of the plurality of elastically deformable protrusions with the plurality of receiving structures. The method yet further includes performing an elastic averaging of the elastic deformation over the plurality of elastically deformable protrusions to account for positional variation of the plurality of elastically deformable protrusions The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

The following description is merely exemplary in nature and is not intended to limit the present disclosure, its application or uses. It should be understood that throughout the drawings, corresponding reference numerals indicate like or corresponding parts and features.

Figure 1:
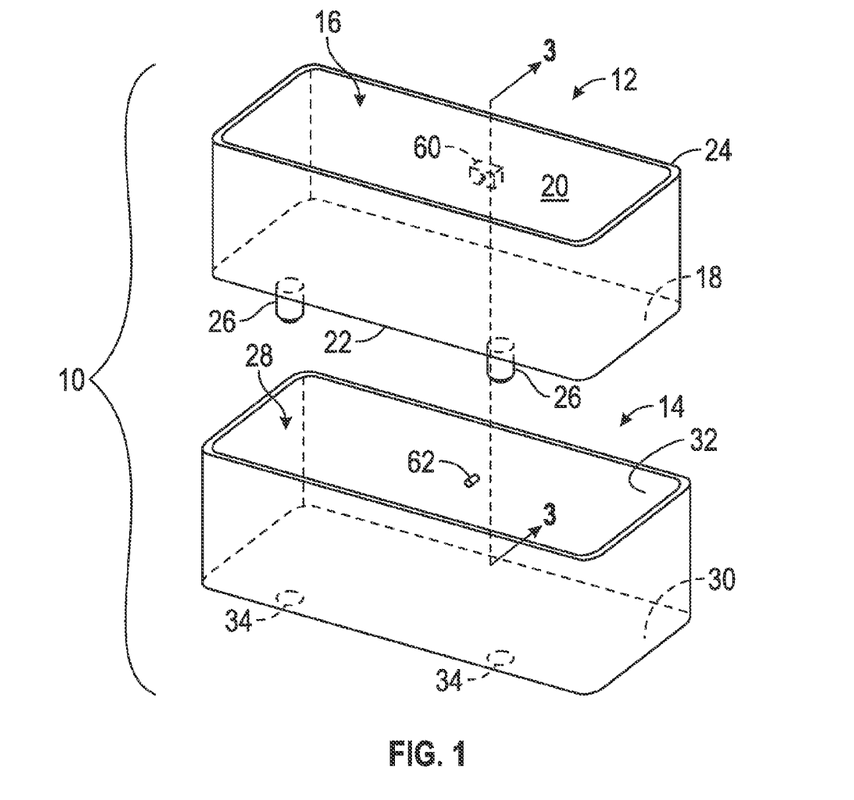
FIG. 1 is a perspective view of an elastic attachment assembly.

Referring to FIG. 1, an elastic attachment assembly 10 is illustrated. The elastic attachment assembly 10 comprises matable components, such as a first component 12 and a second component 14 that are configured to be mated and aligned with respect to each other. In one embodiment, the elastic attachment assembly 10 is employed in a vehicle application, and comprises a vehicle feature such as a vehicle console assembly. However, it is to be understood that the components may be associated with numerous other applications and industries, such as home appliance and aerospace applications, for example. In an exemplary embodiment such as the aforementioned vehicle console assembly for an automobile, the first component 12 comprises a vehicle console bin and the second component 14 comprises a vehicle console shell for receiving the vehicle console bin.

Although illustrated in a specific geometry, the first component 12 and the second component 14 may be configured in countless geometries. Irrespective of the precise geometry of the first component 12 and the second component 14, the first component 12 is configured to align and fittingly mate with the second component 14, which will be described in detail below. In an alternative embodiment, rather than two components comprising the elastic attachment assembly 10, additional or intermediate layers or components may be included. It is to be appreciated that the elastic attachment assembly 10 is to be employed for increasing the stiffness of the first component 12 and the second component 14 in an assembled condition. The elastic attachment assembly 10 provides a self-aligning relationship between components, such as the first component 12 and the second component 14, while also assisting in securely mating the components to each other. As will be described below, a stiff, fitted engagement between the first component 12 and the second component 14 reduces free or relative movement between the components. Such an assembly condition reduces vibration associated with operations of an application that the components are integrated with and more effectively accounts for load transfer capability between the first component 12 and the second component 14.

The first component 12 includes a compartment 16 defined by a base inner surface 18 and at least one side inner surface 20 extending relatively perpendicularly from a plane that the base inner surface 18 is substantially aligned with. As can be appreciated, the at least one side inner surface 20 may comprise a single wall that fully extends proximate the perimeter of the base inner surface 18, or a plurality of walls that are joined to extend proximate the perimeter of the base inner surface 18 in combination. The first component 12 also includes a base outer surface 22 and at least one side outer surface 24 extending relatively perpendicularly from a plane that the base outer surface 22 is substantially aligned with. Extending from the base outer surface 22 is a plurality of elastically deformable protrusions 26 in a direction relatively orthogonal from the plane that the base outer surface 22 is aligned with. The plurality of elastically deformable protrusions 26 are operatively coupled to the base outer surface 22 and may be integrally formed with the base outer surface 22.

The second component 14 includes a pocket portion 28 configured to receive the first component 12 therein. The pocket portion 28 is defined by a base wall 30 and at least one sidewall 32 extending from the base wall 30. The at least one sidewall 32 typically extends relatively perpendicularly from the base wall 30, but it is to be understood that extending of the at least one sidewall 32 from the base wall 30 at alternative angular orientations is contemplated. Disposed within and defined by the base wall 30 are a plurality of receiving structures 34. The plurality of receiving structures 34 are configured to engage and receive the plurality of elastically deformable protrusions 26 upon mating of the first component 12 and the second component 14.

Figure 2:
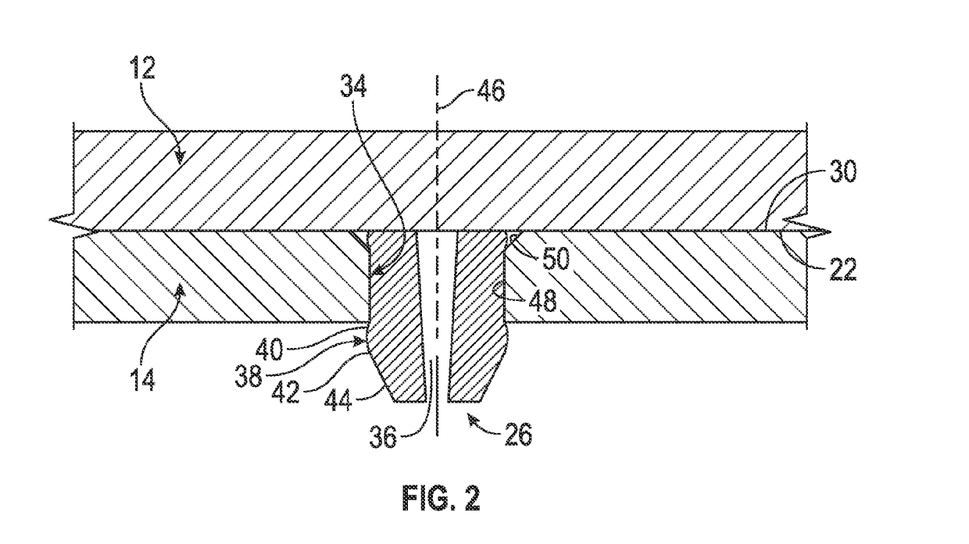
FIG. 2 is a cross-sectional view of an elastically deformable protrusion engaged with a receiving structure.

Referring to FIG. 2, an enlarged cross-sectional view of one of the plurality of elastically deformable protrusions 26 engaged with one of the plurality of receiving structures 34 is illustrated in greater detail. The plurality of elastically deformable protrusions 26 and the plurality of receiving structures 34 may be formed of numerous contemplated embodiments. In the exemplary embodiment, the plurality of elastically deformable protrusions 26 are each formed as a relatively tubular protrusion having a hollow portion 36 that is substantially centrally disposed with respect to a protrusion engagement wall 38. It is to be appreciated that the plurality of elastically deformable protrusions 26, and more specifically the protrusion engagement wall 38 and/or the hollow portion 36 may be of similar or distinct shapes, such as circular or rectilinear, for example. The plurality of receiving structures 34 may comprise slots or trough-like structures or apertures extending through the base wall 30 of the second component 14.

In addition to the embodiment described above, the plurality of elastically deformable protrusions 26 may be formed of elastically deformable clips. As will be apparent from the description below, the elastically deformable nature of the protrusions, in combination with the particular orientations described above, facilitates precise alignment of the first component 12 relative to the second component 14 by accounting for positional and/or tolerance variation of the retaining and/or locating features of the first component 12 and the second component 14 inherently present due to manufacturing processes. The elastic nature of the elastic attachment assembly 10 and the precise alignment between the first component 12 and the second component 14 reduces excessive movement, reduces vibrational characteristics, and stiffens the first component 12 relative to the second compartment 14. The self-aligning benefits associated with the elastic attachment assembly 10 will be described in detail below.

In the illustrated embodiment, the protrusion engagement wall 38 includes a first portion 40 extending relatively perpendicularly from the base outer surface 22 to an intermediate portion 42. A second portion 44 extends from the intermediate portion 42 and is disposed at an angle to the first portion 40, and more specifically at an angle that tapers inwardly toward a central axis 46. As described above, the plurality of receiving structures 34 may be formed in the base wall 30 in a variety of geometrical formations. In the illustrated embodiment, a round aperture is shown to correspond to the protrusion engagement wall 38 of the elastically deformable protrusion 26. The receiving structure 34 includes an engagement surface 48 that includes a chamfer portion 50 disposed proximate the base wall 30. The chamfer portion 50 comprises a beveled surface and is configured to provide a "lead-in," or guide region, for the protrusion engagement wall 38 of the elastically deformable protrusion 26. Numerous angles of the chamfer portion 50 are contemplated.

The elastically deformable protrusion 26 of the first component 12 is positioned and engaged with the receiving structure 34 of the second component 14 upon translation of the first component 12 toward the second component 14. In this way, the first component 12 is press fit into the second component 14 upon engagement of the plurality of elastically deformable protrusions 26 with the plurality of receiving structures 34. The second portion 44 engages the engagement surface 48, and more specifically the chamfer portion 50. Subsequent translation of the elastically deformable protrusion 26 into the receiving structure 34 results in an elastic deformation of the deformable protrusion 26 by imposition of a compressive force on the protrusion engagement wall 38. It is to be appreciated that elastic deformation of the elastically deformable protrusions 26 is further facilitated by embodiments comprising the hollow portion 36 disposed radially inwardly of the protrusion engagement wall 38. The void of material defined by the hollow portion 36 enhances the flexibility of the plurality of elastically deformable protrusions 26.

The term "elastically deformable" refers to components, or portions of components, including component features, comprising materials having a generally elastic deformation characteristic, wherein the material is configured to undergo a resiliently reversible change in its shape, size, or both, in response to application of a force. The force causing the resiliently reversible or elastic deformation of the material may include a tensile, compressive, shear, bending or torsional force, or various combinations of these forces. The elastically deformable materials may exhibit linear elastic deformation, for example that described according to Hooke's law, or non-linear elastic deformation.

Numerous examples of materials that may at least partially form the components include various metals, polymers, ceramics, inorganic materials or glasses, or composites of any of the aforementioned materials, or any other combinations thereof. Many composite materials are envisioned, including various filled polymers, including glass, ceramic, metal and inorganic material filled polymers, particularly glass, metal, ceramic, inorganic or carbon fiber filled polymers. Any suitable filler morphology may be employed, including all shapes and sizes of particulates or fibers. More particularly any suitable type of fiber may be used, including continuous and discontinuous fibers, woven and unwoven cloths, felts or tows, or a combination thereof. Any suitable metal may be used, including various grades and alloys of steel, cast iron, aluminum, magnesium or titanium, or composites thereof, or any other combinations thereof. Polymers may include both thermoplastic polymers or thermoset polymers, or composites thereof, or any other combinations thereof, including a wide variety of co-polymers and polymer blends. In one embodiment, a preferred plastic material is one having elastic properties so as to deform elastically without fracture, as for example, a material comprising an acrylonitrile butadiene styrene (ABS) polymer, and more particularly a polycarbonate ABS polymer blend (PC/ABS), such as an ABS acrylic. The material may be in any form and formed or manufactured by any suitable process, including stamped or formed metal, composite or other sheets, forgings, extruded parts, pressed parts, castings, or molded parts and the like, to include the deformable features described herein. The material, or materials, may be selected to provide a predetermined elastic response characteristic of the plurality of elastically deformable protrusions 26. The predetermined elastic response characteristic may include, for example, a predetermined elastic modulus.

The precise position where engagement between the protrusion engagement wall 38 and the plurality of receiving structures 34 occurs will vary depending on positional variance imposed by manufacturing factors. Due to the elastically deformable properties of the elastic material comprising the plurality of elastically deformable protrusions 26, the criticality of the initial location of engagement is reduced. Further insertion of the plurality of elastically deformable protrusions 26 into the plurality of receiving structures 34 ultimately leads to a fully engaged position of the plurality of elastically deformable protrusions 26. As the protrusion is inserted into the receiving structure, engagement of the protrusion engagement wall 38 with the engagement surface 48 results in the protrusion being elastically deformed and cantilevered radially inwardly.

In the fully engaged position, a tight, fitted engagement between the plurality of elastically deformable protrusions 26 and the plurality of receiving structures 34 is achieved by the contact interfaces located between the protrusion engagement wall 38 and the engagement surface 48. Such a condition is ensured by sizing the protrusion perimeters to be larger than the receiving structure perimeters. A protrusion perimeter is defined by the distance between oppositely disposed points along the protrusion engagement wall 38. The receiving structure perimeter is defined by the distance between oppositely disposed points along the engagement surface 48. The interference between the plurality of elastically deformable protrusions 26 and the plurality of receiving structures 34 causes elastic deformation proximate the protrusion engagement wall 38. The malleability of the materials reduces issues associated with positional variance. More particularly, in contrast to a rigid insert that typically results in gaps and free movement between the insert and receiving structure at portions around the perimeter of the insert, the plurality of elastically deformable protrusions 26 advantageously deforms to maintain alignment of the first component 12 and the second component 14, while also reducing or eliminating gaps and free movement associated with manufacturing challenges, thus stiffening the mated assembly.

Figure 7:
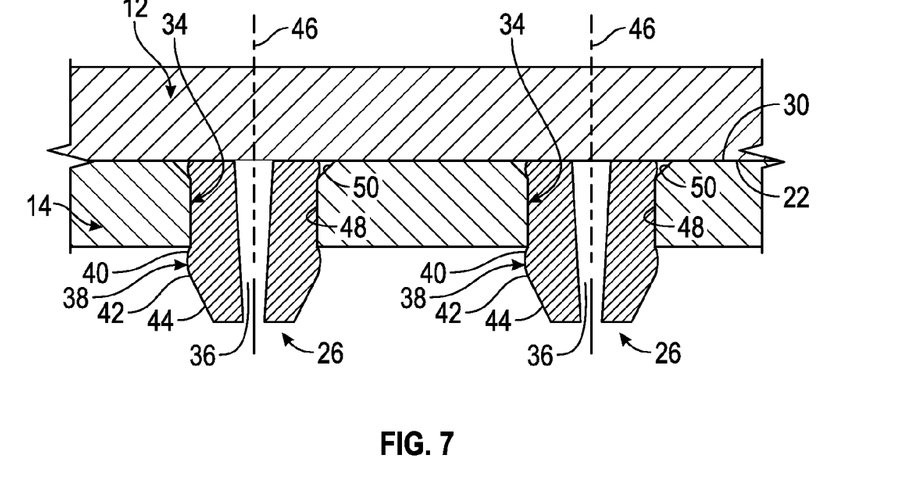
FIG. 7 is a cross-sectional view of a plurality of elastically deformable protrusions engaged with a plurality of receiving structures, illustrating an elastic averaging of the plurality of elastically deformable protrusions.

Referring again to FIGS. 1, 2 and 7, the elastic deformation of the plurality of elastically deformable protrusions 26 elastically averages any positional errors of the first component 12 and the second component 14. In other words, gaps that would otherwise be present due to positional errors associated with portions or segments of the first component 12 and the second component 14, particularly locating and retaining features, are eliminated by offsetting the gaps with an over-constrained condition of other elastically deformable protrusions. Specifically, the positional variance of each protrusion is offset by the remaining protrusions to average in aggregate the positional variance of each protrusion. Elastic averaging provides elastic deformation of the interface(s) between mated components, wherein the average deformation provides a precise alignment, the manufacturing positional variance being minimized to $X_{min}$, defined by $X_{min}=X/\sqrt{N}$, wherein X is the manufacturing positional variance of the locating features of the mated components and N is the number of features inserted. To obtain elastic averaging, an elastically deformable component is configured to have at least one feature and its contact surface(s) that is over-constrained and provides an interference fit with a mating feature of another component and its contact surface(s). The over-constrained condition and interference fit resiliently reversibly (elastically) deforms at least one of the at least one feature or the mating feature, or both features. The resiliently reversible nature of these features of the components allows repeatable insertion and withdrawal of the components that facilitates their assembly and disassembly. Positional variance of the components may result in varying forces being applied over regions of the contact surfaces that are over-constrained and engaged during insertion of the component in an interference condition. It is to be appreciated that a single inserted component may be elastically averaged with respect to a length of the perimeter of the component. The principles of elastic averaging are described in detail in commonly owned, co-pending U.S. patent application Ser. No. 13/187,675, the disclosure of which is incorporated by reference herein in its entirety. The embodiments disclosed above provide the ability to convert an existing component that is not compatible with the above-described elastic averaging principles to an assembly that does facilitate elastic averaging and the benefits associated therewith.

Figure 3:
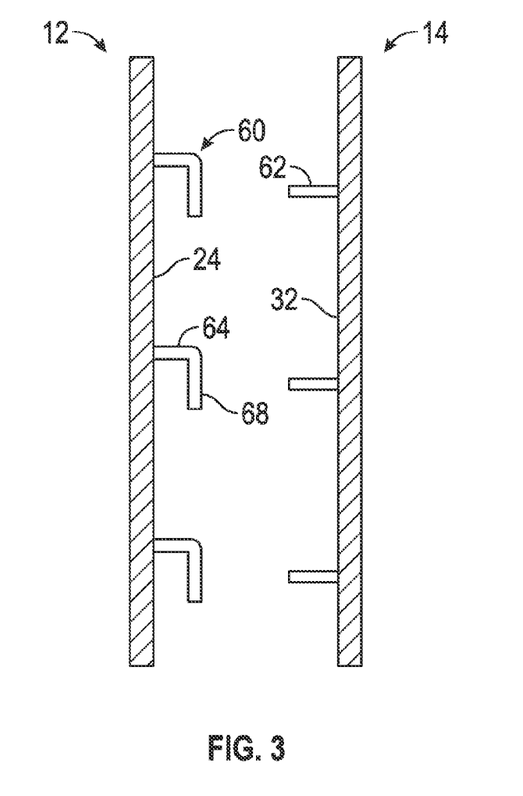
FIG. 3 is a side, elevational view of a plurality of elastically deformable components prior to engagement with corresponding engagement portions according to a first embodiment.
Figure 4:
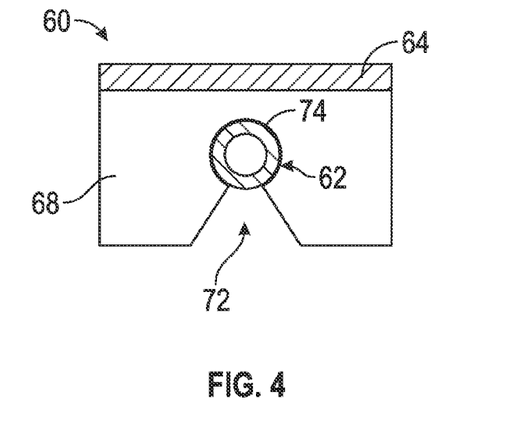
FIG. 4 is a bottom plan view of one of the plurality of elastically deformable components engaged with an engagement portion according to the embodiment illustrated in FIG. 3.
Figure 5:
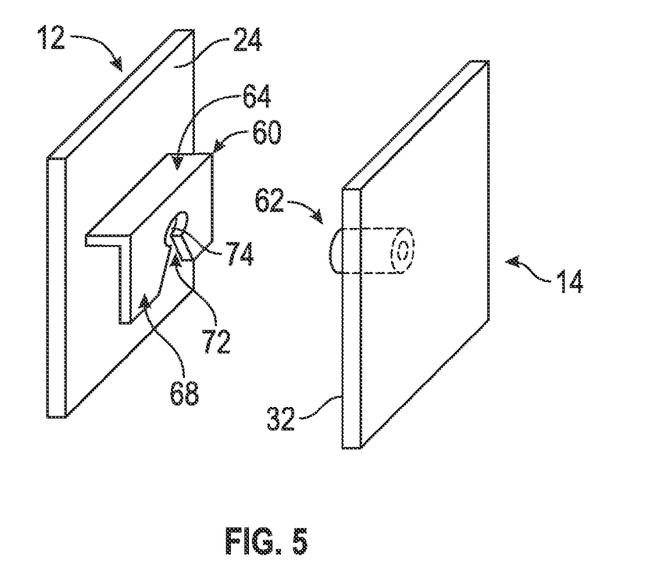
FIG. 5 is a perspective view of one of the plurality of elastically deformable components prior to engagement.

Referring now to FIGS. 3-5, additional stability of the first component 12 relative to the second component 14 is provided by a plurality of elastically deformable components 62 (also generically illustrated in FIG. 1) extending from the at least one sidewall 32 of the second component 14. It is to be appreciated that the plurality of elastically deformable components 62 may be disposed along a single surface or a plurality of surfaces, depending upon the structure of the at least one sidewall 32. The plurality of elastically deformable components 62 is configured to engage an engagement portion 60 (also generically illustrated in FIG. 1) of the first component 12. The engagement portion 60 may comprise a portion of the at least one side outer surface 24 or may extend therefrom as an additional component. In an alternative embodiment, the plurality of elastically deformable components 62 is not elastically deformable, but rather rigid structures that engage elastically deformable engagement portions. It is to be understood that one or both of the plurality of elastically deformable components 62 and the engagement portion 60 are deformable. As with the plurality of elastically deformable protrusions 26 described in detail, the plurality of elastically deformable components 62 are formed of at least one of the elastically deformable materials discussed above.

A first embodiment of the plurality of elastically deformable components 62 and the engagement portion 60 is illustrated in FIGS. 3 and 4. In the illustrated embodiment, each of the plurality of deformable components 62 comprises a hollow tube portion extending from the at least one sidewall 32. Numerous alignments are contemplated, but in the exemplary embodiment, the engagement portion 60 comprises a first segment 64 extending relatively perpendicularly from the at least one side outer surface 24 and a second segment 68 extending relatively perpendicularly from the first segment 64, such as in a predominantly downwardly extending manner. The engagement portion 60 comprises a slot structure 72 extending from the at least one outer side surface 24. The slot structure 72 includes a pin receiving portion 74 configured to fittingly receive the plurality of deformable components 62, and more particularly the hollow tube portion. The slot structure 72 is formed in the second segment 68 of the engagement portion 60.

The hollow tube portion is illustrated in a tubular-shaped configuration, however, it is to be understood that alternate geometries are contemplated. Irrespective of the precise geometry, the plurality of elastically deformable components 62 comprises a perimeter that is greater than a perimeter of the pin receiving portion 74 of the slot structure 72. As described in detail above with respect to the plurality of elastically deformable protrusions 26 and the plurality of receiving structures 34, elastic deformation of the plurality of elastically deformable components 62 results upon insertion into the pin receiving portion 74 based on the relative sizing of the components.

Figure 6:
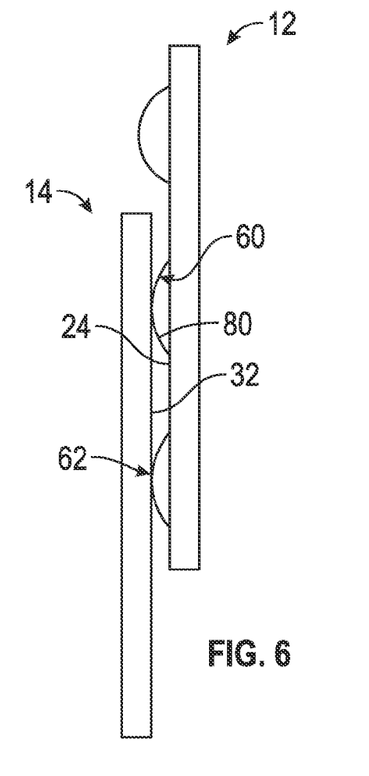
FIG. 6 is a side, elevational view of an elastically deformable component according to a second embodiment.

Referring to FIG. 6, a second embodiment of the plurality of elastically deformable components 62 and the engagement portion 60 is illustrated. In the illustrated embodiment, each of the plurality of deformable components 62 comprises a rib 80 extending from the at least one side outer surface 24. Numerous alignments are contemplated, but in the exemplary embodiment, the rib 80 comprises an arcuate-shaped configuration that arches or bows away from the at least one side outer surface 24 and is configured to elastically deform and/or deflect upon engagement with the engagement portion 60, thereby creating spring tension between the rib 80 and the engagement portion 62, which in the illustrated embodiment comprises the at least one sidewall 32.

As one can appreciate, the embodiments described above may be altered by switching the location of the plurality of elastically deformable components 62 with the engagement portion 60. Specifically, in one embodiment the hollow tube may be operatively coupled to, and extend from, the at least one side outer surface 24, while the engagement portion 60 is operatively coupled to, and extends from the at least one sidewall 32. In such an embodiment, the first segment 64 extends outwardly away from the at least one sidewall 32, with the second segment 68 extending relatively perpendicularly therefrom, such as in an upwardly directed manner. The tube is then configured to slide downwardly into, and engage, the slot structure 72 of the engagement portion 60. Similarly, the ribs described above may be connected to the at least one sidewall 32, rather than the at least one side outer surface 24.

Each embodiment of the plurality of elastically deformable components 62 described above advantageously reduces movement of the first component 12 relative to the second component 14 by imposing contact interferences between the plurality of elastically deformable components 62 and the engagement portion 60. Upon reaching the fully engaged position of the first component 12 with the second component 14, the deformation of the plurality of elastically deformable components 62 is averaged in aggregate relative to each other, as described in detail above, with respect to the plurality of elastically deformable protrusions 26.

Figure 8:
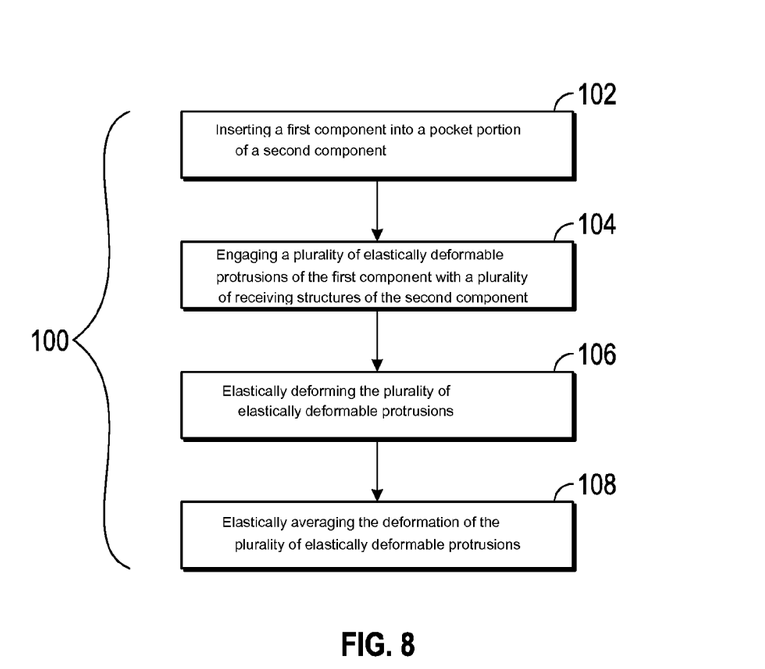
FIG. 8 is a flow diagram illustrating a method of reducing positional variation and increasing stiffness of the elastic attachment assembly.

A method of reducing positional variation, freedom of movement, and vibration as well as increasing the stiffness of an elastic attachment assembly 100 is also provided, as illustrated in FIG. 8, and with reference to FIGS. 1-7. The elastic attachment assembly 10, and more specifically the elastically deformable nature of the plurality of elastically deformable protrusions 26 and the elastically deformable components 62 have been previously described and specific structural components need not be described in further detail. The method 100 includes inserting 102 the first component 12 into the pocket portion 28 of the second component 14. The method also includes engaging 104 the plurality of elastically deformable protrusions 26 with the plurality of receiving structures 34. The method further includes elastically deforming 106 the plurality of elastically deformable protrusions 26 upon engagement of the plurality of elastically deformable protrusions 26 with the plurality of receiving structures 34. The method yet further includes performing 108 an elastic averaging of the elastic deformation over the plurality of elastically deformable protrusions 26 to account for positional variation, reduced free movement, and increased stiffness of the plurality of elastically deformable protrusions 26.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An elastic attachment assembly comprising:
    a first component having a base outer surface and at least one side outer surface extending from the base outer surface, the first component comprising:
        a plurality of elastically deformable protrusions extending from the base outer surface of the first component, each of the elastically deformable protrusions comprising a tubular member having an engagement wall having a first perimeter; and
        at least one engagement portion extending from the side outer surface of the first component; and
    a second component having a pocket portion configured to receive the first component therein, the pocket portion defined by a base wall and at least one sidewall extending from the base wall; the second component comprising:
        a plurality of receiving structures defined in the base wall of the pocket portion and configured to receive the plurality of elastically deformable protrusions, wherein the plurality of elastically deformable protrusions is configured to elastically deform upon insertion into the plurality of receiving structures, each of the plurality of receiving structures comprising an engagement surface having a second perimeter that is less than the first perimeter; and at least one elastically deformable component extending from the sidewall and configured to be received within the at least one engagement portion of the first component;

wherein a fully engaged position of the first component with the second component comprises contact interference between the engagement wall of each of the plurality of elastically deformable protrusions with the engagement surface of each of the plurality of receiving structures and between the at least one engagement portion and the at least one elastically deformable component, wherein respective positional deviations from respective nominal alignment positions of the first component and the second component is averaged when the engagement surface surrounding the engagement wall is in the fully engaged position.

2. The elastic attachment assembly of claim 1, wherein the elastic deformation of the plurality of elastically deformable protrusions comprises a resiliently reversible change in at least one of shape and size.

3. The elastic attachment assembly of claim 1, wherein the plurality of elastically deformable protrusions is integrally formed with the base outer surface.

4. The elastic attachment assembly of claim 1, wherein the at least one sidewall of the second component comprises a plurality of elastically deformable components extending therefrom, each of the elastically deformable components configured to engage one of a plurality of engagement portions of the first component.

5. The elastic attachment assembly of claim 4, wherein the plurality of elastically deformable components comprises a pin portion, and wherein each engagement portion comprises a slot structure configured to receive the plurality of elastically deformable components therein.

6. The elastic attachment assembly of claim 5, wherein the perimeter of the plurality of elastically deformable components is greater than the perimeter of the slot structure.

7. The elastic attachment assembly of claim 1, wherein the at least one engagement portion of the first component comprises a plurality of elastically deformable ribs extending therefrom, each of the ribs configured to engage one of a plurality of apertures in the second component.

8. The elastic attachment assembly of claim 7, wherein the rib comprises an arcuate shaped geometry arching away from the at least one side outer surface.

9. The elastic attachment assembly of claim 8, wherein the rib comprises a rib width and the aperture comprises an aperture width, and wherein the rib width is greater than the aperture width.

10. The elastic attachment assembly of claim 1, wherein the first component comprises a vehicle console bin, and wherein the second component comprises a vehicle console shell.

* * * * *